United States Patent [19]

Knauss

[11] 4,193,542
[45] Mar. 18, 1980

[54] THERMOSTATIC VALVE

[75] Inventor: Erwin Knauss, Gundelsheim, Fed. Rep. of Germany

[73] Assignee: Braukmann Armaturen A.G., Rothrist, Switzerland

[21] Appl. No.: 860,062

[22] Filed: Dec. 13, 1977

[30] Foreign Application Priority Data

Dec. 18, 1976 [DE] Fed. Rep. of Germany ....... 2657512

[51] Int. Cl.$^2$ .............................................. F01P 7/02
[52] U.S. Cl. .................................. 236/34.5; 236/93 A
[58] Field of Search ...................... 236/34, 34.5, 93 A; 251/367; 137/533.11, 533.15

[56] References Cited

U.S. PATENT DOCUMENTS

| | | | |
|---|---|---|---|
| 903,081 | 11/1908 | Guthrie et al. | 137/533.11 X |
| 1,403,886 | 1/1922 | Young | 137/533.11 X |
| 2,829,835 | 4/1958 | Branson | 236/34.5 |
| 3,172,602 | 3/1965 | Drapeau | 236/34.5 |
| 4,018,247 | 4/1977 | Carr | 137/533.11 X |
| 4,022,377 | 5/1977 | Wagner et al. | 236/34.5 |
| 4,052,965 | 10/1977 | Morris | 236/34.5 X |
| 4,062,378 | 12/1977 | Bender | 251/367 X |

Primary Examiner—William E. Wayner
Assistant Examiner—William E. Tapolcai, Jr.
Attorney, Agent, or Firm—William T. Howell

[57] ABSTRACT

A thermostatic valve for controlling flow comprises a housing formed of first and second parts providing a first chamber in which is located a valve seat and co-operating valve plate operable by a thermostatic element. The housing has an inlet and an outlet for the first chamber and, exterior of the latter, is a second chamber also formed by the two parts which provides a vent valve seat, the second chamber being intermediate of the inlet and outlet to the housing. The second chamber has a closing float element engageable with the vent valve seat to prevent air from disturbing the flow of the coolant over the thermostatic element.

8 Claims, 6 Drawing Figures

THERMOSTATIC VALVE

FIELD OF INVENTION

The invention relates to a thermostat valve, especially for the cooling system of an internal combustion engine, having a vent valve of which the valve seat is fitted to thermostat valve housing externally of the thermostat valve seat, the said thermostat valve housing consisting of at least two parts, one of which contains the vent valve seat.

PRIOR ART

A thermostat valve of this kind is already known. It comprises a floating closure element in the form of a dumb bell, the shank of which passes through the bore in the valve seat. It must, therefore, be made in two parts. This increases the cost of both production and assembly. Furthermore, the vent valve operates properly only if the thermostat valve is installed vertically, which is not always practicable. With the thermostat valve installed in any other position, instability must be expected in both the open and the closed position. Moreover, the behaviour of the vent valve is also greatly dependent upon the r.p.m. of the circulating pump and upon the vibration to which the thermostat valve is subjected.

SUMMARY OF THE INVENTION

It is, therefore, the purpose of the invention to provide a thermostat valve of the type described above, the said valve being equipped with a vent valve which is inexpensive to produce and assemble, and which is largely independent of the orientation an operating conditions of the valve.

This purpose may be achieved with the thermostat valve wherein the vent valve seat, which is moulded onto the inlet end of the thermostat housing through passage, is located in the interior of the chamber preferably consisting of two housing parts, at least one of which constitutes the chamber cavity. In other words, one of the two parts of the housing contains the whole chamber, while the other part acts as a cover, or else one part of the chamber is moulded onto each part of the housing, and the passage comprising the vent valve seat opens into one part of the chamber. Before the valve is assembled, the float is placed in the chamber, or in one of the parts of the chamber. After the housing parts have been united, it is prevented from falling out and may immediately function as a valve closing element. The closing element of the vent valve normally rests upon the lower end of the chamber, when the valve is in the installed position. Thus any air entering the chamber below, or from the side, may pass laterally thereby and may leave through the valve seat located above the closure element, and through the housing passage connected thereto. If the closing element is lifted, or carried along by the flow of coolant, it bears against the valve seat, thus very quickly preventing the coolant from flowing away through the vent valve seat.

The two parts of the housing are joined together advantageously by means of a clamp, a snap fastener or a bayonet fastener, and may, therefore, be assembled without any tools. But they may also be united by other known means, for instance they may be screwed together. According to another configuration of the invention, in which a bayonet fastener is used, it is proposed that one part of the housing shall have a preferably annular edge engaging in a matching recess or bore in the other part of the housing, and that the insertable part of the housing shall have, for the purpose of forming the bayonet fastener, recesses arranged around its outer periphery for the accommodation of the matching bayonet fastener cables in the other part of the housing. At least one, but preferably both parts of the housing should be sufficiently resilient to allow the catches to be brought into the vicinity of the recesses and latched into them. The said recesses and catches are preferably distributed uniformly around the periphery 2 or 3 of each being sufficient.

According to another variant of the invention, the two parts of the housing are made of synthetic material and the bayonet catches are moulted onto one housing part, while the other housing part contains the recesses.

According to a further development of the invention, the two parts of the housing are in the form of a cage and are substantially pot or dish-shaped, with the edge of one pot engaging over that of the other. The spaces between the cage elements, or webs, of the two parts of the housing forms passages for the coolant.

The seat of the thermostat valve may with advantage be moulded onto the part of the housing comprising the pickup for the annular attachment element. The valve head, the valve spring, and the thermostat element are located in known fashion inside the thermostat valve housing, one end of the said thermostat element projecting outwardly beyond the thermostat valve, at least when the valve is open or partly open.

According to still another configuration of the invention, the vent valve closing element is in the form of a ball, preferably made of corrosion resistant steel. Plastics are noted both for their resistance to corrosion and their low specific weight.

In another configuration of the invention, in which their thermostat valve is provided with a housing attachment edge, at least one mark and/or a half with a catch connection is arranged on, or in the vicinity of the attachment edge. The said connection, or the mark, position the vent valve in the cooling system, this ensuring that it functions correctly. The second half of the catch connection and/or a matching mark, is located on the thermostat valve receiver.

DESCRIPTION OF THE DRAWINGS

An example embodiment of the invention is illustrated in the drawings attached hereto, wherein.

DESCRIPTION OF A PREFERRED EMBODIMENT

Figure 1:
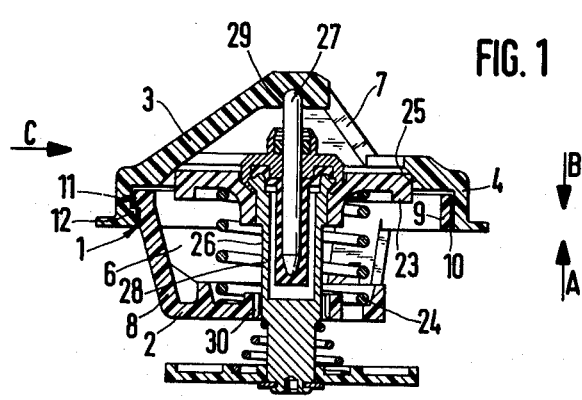
FIG. 1 is a vertical section through the thermostat valve according to the invention.

The thermostat valve according to the invention has a two part housing 1, one part being marked 2 and the other 3. Generally speaking, both parts are pot or dish-shaped, with the edge of one part fitting over that of the other. The walls of the pots are pierced to form passages 5,6 for the coolant, leaving only webs 7,8 standing. The example of embodiment illustrated has three webs arranged at 120° to each other. Housing part 2 has an annular attachment ring 9 which enters a stepped recess 10 in housing part 3, the two parts being held together by means of a bayonet fastener 11. To this end, the outer periphery of attachment edge 9 of housing part 2 has bayonet fastener recesses 12 for the accommodation of bayonet fastener catches 13, the latter being moulded onto the lower inner end of edge 4 of housing part 3. Housing parts 2 and 3 are preferably made of plastic, the two halves of snap fasteners 11 being moulted thereto.

Figure 2:
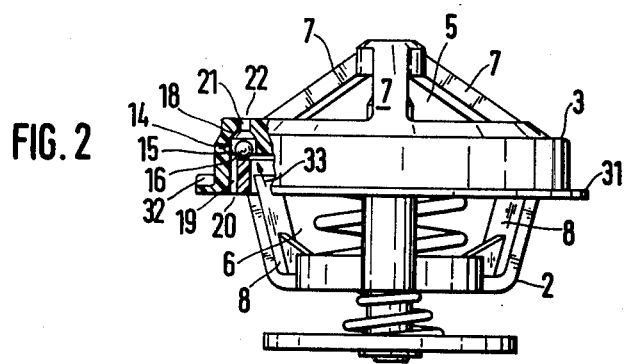
FIG. 2 is a view of FIG. 1 in the direction of arrow C therein, in part vertical section.
Figure 3:
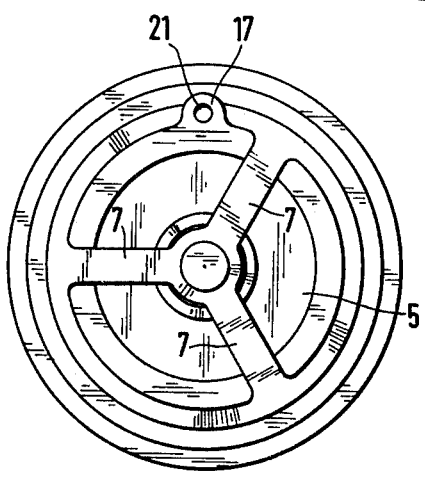
FIG. 3 is a plan view of FIG. 1.
Figure 4:
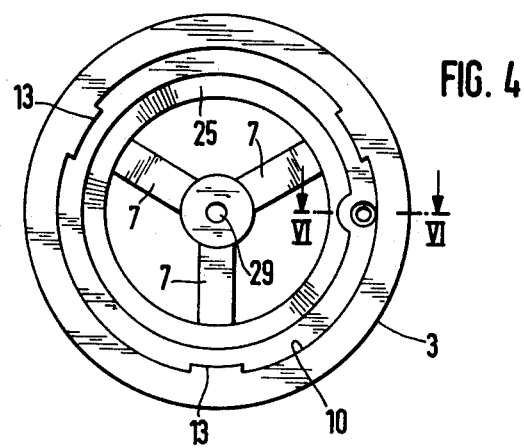
FIG. 4 is a view of housing part 3 in the direction of arrow A in FIG. 1.
Figure 5:
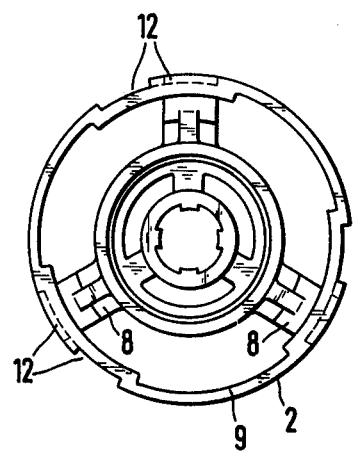
FIG. 5 is a view of housing part 2 in the direction of arrow B in FIG. 1.
Figure 6:
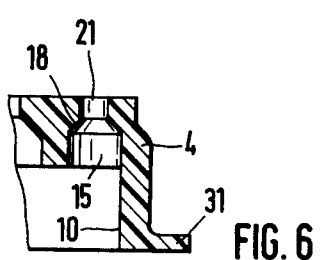
FIG. 6 is a broken away section along the line VI—VI in FIG. 4.

The thermostat valve is equipped with a vent valve 14. According to the invention, housing parts 2,3 form a chamber 15 for the accommodation of a vent valve closing element 16 which is in the form of a ball and is preferably made of a corrosion resistant material, more particularly steel. This ball rests upon the end face, pointing into the interior of the housing of attachment edge 5 of housing part 2, the revelant portion of the said attachment edge also constituting the lower chamber wall or cover. The remaining chamber walls are provided by a bore running parallel with the longitudinal axis of the thermostat valve, more particularly on an eye 17 in housing part 3. The conical part of this bore, tapering from bottom to top in FIG. 2, serves as the seat 18 of vent valve 14. An inlet passage 19 in housing part 2 and/or housing part 3, provides a connection to the inlet side of the thermostat valve, while a passage running upwardly in housing part 3 or in eye 17 from valve seat 18, provides a pneumatic or hydraulic connection between chamber 15 and outlet side 22 of the thermostat valve. The air to be released upon venting may also flow in chamber 15 in the directiion of arrow 33. As shown in FIG. 2, the diameter of passage 21 is smaller than the cylindrical part of the chamber. With vent valve closing element 16 in the position shown in FIG. 2, air located on inlet side 20 of the thermostat valve may flow away through inlet passages 19,33, chamber 15 and passage 21. In the event of a large flow of water through chamber 15, vent valve closing element 16 moves upwardly until it bears against its valve seat 18, and this closes off the said vent valve. Venting is intended to prevent air from disturbing the flow of cooling over thermostat element 26.

When vent valve 14 is closed, the coolant can flow only externally past valve plate 23, as long as the latter has been lifted from seat 25 against the force of a compression spring 24, i.e. if it moves in a downward direction according to FIG. 1. In the example of embodiment illustrated, valve seat 25 is moulded onto housing part 3 and, when the unit is installed, it is located under web 7. This valve plate is opened in known fashion when thermostat element 26 is heated by the coolant, the said heating resulting in relative movement between housing 28 of the thermostat element 26 and working piston 27 thereof. The spherical end of the said piston is accommodated in a similarly shaped recess 29 in the top of housing part 3. In its operative position (FIG. 1), housing part 2 has at its lower end a passage 30 through which housing 28 of thermostat element 26 can pass without contact, or with only slight guidance, when the coolant heats up.

Housing 1 or, in the example of embodiment illustrated, housing part 3 has an attachment edge 31 extending radially outwards, by means of which the thermostat valve can be secured in the cooling circuit of an internal combustion engine, for example. In order to ensure that vent valve 14 is correctly positioned in this cooling system, one half 32 of a catch connection is fitted to edge 31, preferably by moulding on, while the other half is located on the corresponding component in the cooling system.

Housing part 2 may be snapped into housing part 3, for instance by means of a circlip, not shown.

I claim:

1. A thermostatic valve for controlling liquid flow comprising a housing formed of first and second interconnecting parts providing a first chamber in which is located a first valve seat and co-operating valve plate operable by a thermostatic element located in said first chamber to permit liquid flow therethrough past said valve plate, first and second passages in said interconnected parts forming an inlet and an outlet respectively to said first chamber, a second chamber formed by said interconnected parts, exterior of said first chamber, said second chamber being intermediate of said inlet and said outlet, a closing float element contained in said second chamber, a second valve seat in said second chamber forming an exit from said outlet, said closing float element being engageable with said second valve seat, the arrangement being such that liquid flow through said second chamber will have said closing float element to engage with said second valve seat but during disengagement of said closing float element from said second valve seat, air may vent from said inlet to said outlet through said second chamber.

2. A thermostatic valve according to claim 1 wherein said first and second parts are snapped together for connection.

3. A thermostatic valve according to claim 2 wherein said snap connection is effected by providing one of said parts with an annular edge, engageable in a matching recessed portion in the other part.

4. A thermostatic valve according to claim 3 wherein said parts are made of plastic.

5. A thermostatic valve according to claim 4 wherein said parts are substantially pot shaped.

6. A thermostatic valve according to claim 3 wherein said vent valve seat is provided in said matching recessed portion.

7. A thermostatic valve according to claim 1 wherein said float element is a ball.

8. A thermostatic valve according to claim 3 wherein means are provided in said annular edge to locate said first and second parts in the required position on assembly.

* * * * *